United States Patent
Prill

(10) Patent No.: US 7,975,656 B2
(45) Date of Patent: Jul. 12, 2011

(54) CANINE CLEANROOM SUIT

(76) Inventor: Bradley A. Prill, Wildomar, CA (US)

( * ) Notice: Subject to any disclaimer, the term of this patent is extended or adjusted under 35 U.S.C. 154(b) by 49 days.

(21) Appl. No.: 12/291,333

(22) Filed: Nov. 7, 2008

(65) Prior Publication Data

US 2010/0115895 A1 May 13, 2010

(51) Int. Cl.
*A01K 13/00* (2006.01)
(52) U.S. Cl. ......................................................... 119/850
(58) Field of Classification Search .................. 119/850, 119/821; 54/78, 79.1, 79.2, 79.4, 80.1, 80.2; D30/145
See application file for complete search history.

(56) References Cited

U.S. PATENT DOCUMENTS

| | | | | |
|---|---|---|---|---|
| 584,947 A * | 6/1897 | Lundborg | ...................... | 119/836 |
| 1,772,827 A | 8/1930 | Caster-Udell | ................... | 54/79.1 |
| 2,222,705 A | 5/1940 | Conlon | | |
| 2,406,575 A | 9/1943 | Norvig | | |
| D146,698 S | 4/1946 | Cheney | | |
| 2,408,575 A | 10/1946 | Norvig | ........................... | 119/673 |
| 2,443,831 A | 6/1948 | Miller | ............................. | 54/79.1 |
| 3,108,568 A | 10/1963 | Whitney et al. | ................ | 119/174 |
| 3,150,641 A | 9/1964 | Kesh | | |
| D213,053 S | 12/1968 | Church | ......................... | D30/145 |
| D220,191 S | 3/1971 | Giordano | ..................... | D30/145 |
| 3,742,679 A | 7/1973 | Jordan | | |
| 3,753,334 A * | 8/1973 | Blessing | ........................ | 54/80.2 |
| 3,762,073 A | 10/1973 | Cantales | ......................... | 36/111 |
| 3,918,238 A | 11/1975 | Iozzio | | |
| D246,070 S | 10/1977 | Machos | ........................ | D30/144 |
| 4,144,845 A | 3/1979 | Sneider | ........................... | 119/678 |
| 4,355,600 A | 10/1982 | Zielinski | | |
| 4,726,174 A * | 2/1988 | Wilson | ............................. | 54/80.2 |
| 5,060,597 A | 10/1991 | Fredericks | | |
| D330,954 S * | 11/1992 | Nieding | ........................ | D30/145 |
| 5,456,215 A * | 10/1995 | Deutscher et al. | ............. | 119/850 |
| 5,458,094 A | 10/1995 | Proshan | | |
| 5,463,985 A | 11/1995 | Shover | | |
| D374,315 S | 10/1996 | Caditz | | |
| 5,991,921 A | 11/1999 | Saito | | |
| 6,058,890 A | 5/2000 | Harrell | | |
| 6,082,309 A * | 7/2000 | Wexler | .............................. | 119/837 |
| D441,924 S | 5/2001 | Mann | ............................. | D30/145 |
| 6,223,696 B1 | 5/2001 | Murakami | ..................... | 119/850 |
| D459,556 S * | 6/2002 | Martin | .......................... | D30/144 |
| 6,481,383 B1 | 11/2002 | Ross et al. | | |
| RE39,564 E | 4/2007 | Brezinski | ........................ | 119/850 |
| 7,523,720 B1 * | 4/2009 | Lecy et al. | ..................... | 119/832 |
| 2007/0193532 A1* | 8/2007 | Shelton | .......................... | 119/850 |
| 2008/0264351 A1* | 10/2008 | Williams | ........................ | 119/850 |
| 2010/0199928 A1* | 8/2010 | Matsumoto et al. | ........... | 119/850 |

* cited by examiner

*Primary Examiner* — Rob Swiatek
*Assistant Examiner* — Ebony Evans
(74) *Attorney, Agent, or Firm* — Palomar Patent; Calif Tervo; Mary Jo Redman

(57) ABSTRACT

Protective suit for a dog allows a dog to work in a cleanroom or other controlled environment. Suit 10 includes particle-blocking coverall 20 and hood 50. Hood 50 includes transparent face shield 52 to cover dog's eyes and snout. Face shield 52 is open at the end to allow air and odors to reach dog's nose unimpeded. Face shield 52 extends slightly beyond dog's nostrils to prevent dog from contacting hazardous chemicals or pathogens. Coverall 20 includes fitted sleeves 22 with integral boots 24; also a tail pouch 30 to keep tail separate and visible.

3 Claims, 2 Drawing Sheets

CANINE CLEANROOM SUIT

FIELD OF THE INVENTION

The present invention relates to garments for animals, and particularly to a protective garment for a dog working in a cleanroom.

BACKGROUND OF THE INVENTION

Four-legged animals, particularly dogs, have long worn simple garments to protect them from cold or wet weather. Dogs have a wide assortment of sweaters, rain jackets, hats, and boots to keep them comfortable outdoors. Dogs that work often wear distinguishing uniforms, such as the colored capes or vests worn by assistance dogs. Dogs that work in law enforcement or the military may even wear armored apparel.

Dogs that have been groomed for a show may wear some sort of coverall suit to keep them clean, such as to keep them from accidentally rubbing against a dusty surface. Containment suits to keep insecticidal dust in contact with a dog's fur for a period of time are also known.

Both types of "cleanliness" garment for a dog are typically designed with air vents to keep the dog from overheating while wearing the coverall. Thus they prevent bulk transfer of dirt or insecticide between the inside and the outside of the suit, but do not totally prevent material, especially small particles and hairs, from entering or leaving the suit.

One very specialized job that dogs can perform is to identify and locate various harmful materials, such as bacteria, molds, and allergenic chemicals. Colonies of mold, yeast, or bacteria often create chemical products of their metabolism that have an odor that is diagnostic of the type of organism. Dogs can be trained to respond to these characteristic odors and to indicate the location of the strongest source of a detected odor.

For example, a dog trained to recognize characteristic odors from molds can locate infestations that are not visible, such as on the inner surface of wallpaper or underneath floor covering in houses. Dogs can also find colonies of harmful fungi and bacteria in restaurants, hospitals, and manufacturing areas such as semiconductor fabrication cleanrooms.

Bacterial types that can be identified by their odors include *E. Coli, Salmonella*, and *Listeria*. These genera include several pathogenic species that are health hazards to animals and humans. Bacteria and fungi can also cause various types of defects and yield loss in manufacturing.

It is desirable that dogs that perform jobs in restaurants, hospitals or other health care facilities, and manufacturing areas wear distinctive garments to indicate that they are service dogs and not unauthorized pets. Such garments are preferably also protective for the dogs and for the facility.

For example, dogs typically shed hairs, dander, and other materials when they move. These are allergenic to some people and are never seen as benign when found in a restaurant meal or on a semiconductor wafer. Thus, a garment for a dog working in a facility that prepares food, provides health care, or manufactures microscopic or sterile articles would preferably envelop the dog and keep hair and dander inside.

It is desirable that a work garment for a dog be constructed somewhat like "cleanroom" garb for humans: made of lint-free fabric that does not allow passage of small particles in either direction, composed of parts that overlap sufficiently that movement does not open a gap between parts or create a "bellows" effect to puff particles out between parts of the garment, and covering substantially all of the body.

However, human cleanroom garb typically either leaves the face bare or covers the face with a paper or fabric covering that air can penetrate. In the case of extremely "clean" applications, a human cleanroom suit may contain its own air source, such that the person may be totally enclosed in an impermeable unit.

A dog that is trained to detect certain odors uses a special type of breathing that maximizes the sensitivity of the sense of smell. The dog breathes more air in and out than is generally used for simple respiration and the air is preferably not filtered or obstructed. Filtration of the atmosphere through a permeable mask can add spurious odors and obscure the directionality of a scent. Thus, a cleanroom suit for a dog would have special requirements for the design of the face covering.

A dog trained to locate odors typically detects an odor then gradually approaches the strongest source of the odor. To signal the center of the odor, the dog may point to the source of odor with a paw, sit down directly in front of it, or stand close to it and wag the tail. Thus, an odor-detecting dog typically comes close to the source of an odor, which may be a pathogen or substance that may be harmful to the dog.

It would be desirable that a work suit for a dog protect the dog from hazards the dog encounters. Although the dog's nose must be relatively free to process air, it is desirable that the nose also be protected against accidental or careless contact with harmful substances. In fact, it would be desirable that the dog's entire body, including the pads of its paws, be protected from contact with pathogens or harmful chemicals.

There is a need for an identifying garment that a dog can wear while locating characteristic odors in restaurants, hospitals, laboratories, skilled nursing facilities, and cleanrooms. There is further a need for a garment that prevents particles from being shed by the dog while in the controlled facility. There is further a need for a garment that protects the dog from contact with dangerous materials. There is further a need for a protective garment for a dog that does not impede the dog's breathing or interfere with the dog's sense of smell.

SUMMARY OF THE INVENTION

The present invention is "clean" garb for a dog that uses the sense of smell to locate harmful bacteria or fungi in controlled environments such as hospitals and cleanroom manufacturing areas. The coverall covers nearly all of the dog's body and feet while providing a clear airway to the nostrils.

The garb generally includes a body covering suit with integral booties and a hood for covering the head. The body portion includes a back zipper for entry into the suit. Elongated portions enclose each leg separately for easy walking. An elastic band secures each leg portion above the foot to form a bootie, which may include a flexible sole for walking on.

Another elongate portion surrounds the tail. An elastic band holds the tail portion firmly near the base of the tail so that wagging or waving of the tail may be clearly seen by the dog's handler.

A hood for covering the head is donned after the body portion and overlaps it in the head and neck area. An elastic band secures the hood tightly against the base of the neck. The front of the hood is transparent plastic to allow the dog to see. The transparent portion surrounds the snout and extends slightly beyond it. The end of the transparent portion is open to allow free passage of air, but the extended end of the hood prevents the dog's nose from contacting any surface.

The invention will now be described in more particular detail with respect to the accompanying drawings in which like reference numerals refer to like parts throughout.

DETAILED DESCRIPTION OF THE INVENTION

Figure 1:
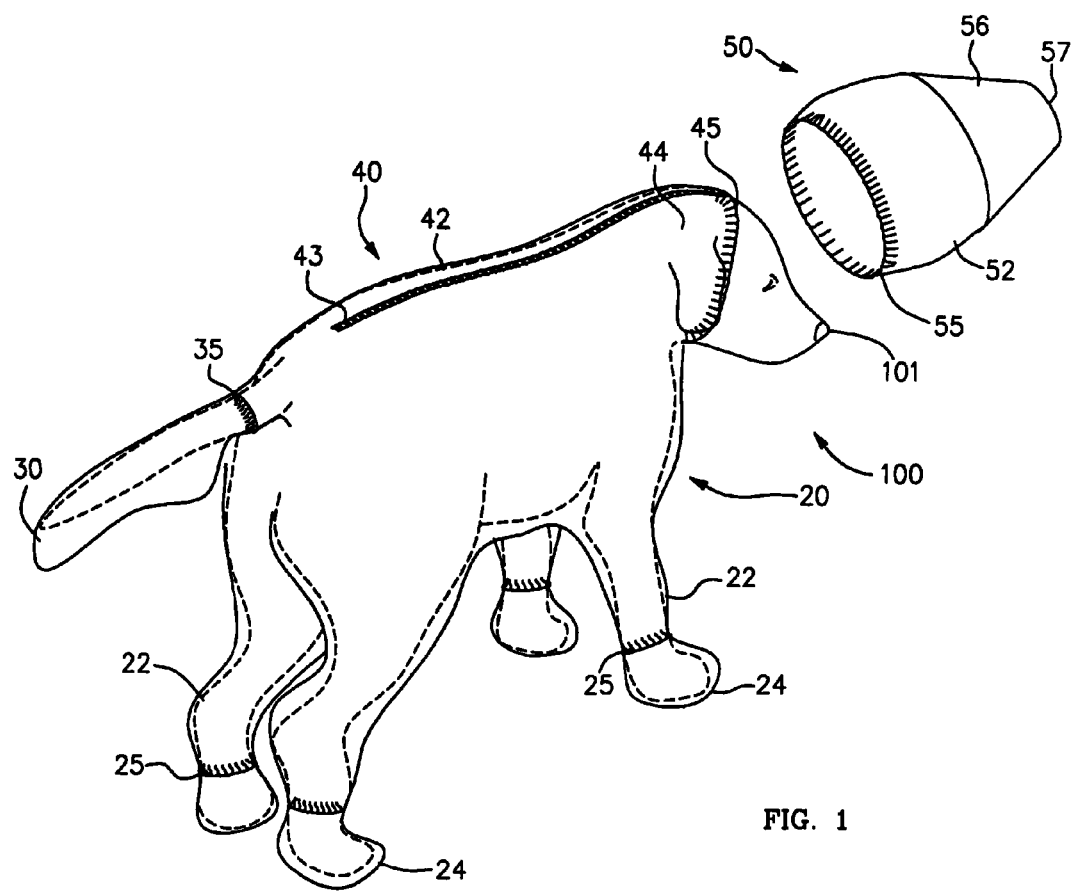
FIG. 1 is a perspective, partly exploded view of the dog wearing work garb of the present invention.

FIG. 1 shows a dog 100 wearing the work garb 10 of the present invention. Work garb 10 includes two main parts: coverall 20 for covering the body and hood 50 for covering the head.

Figure 2:
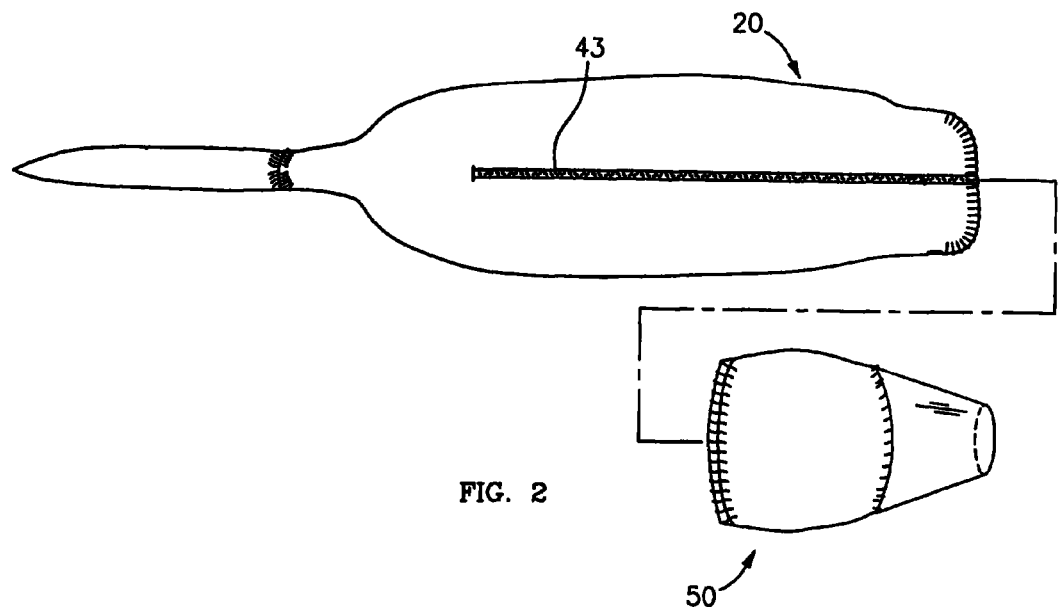
FIG. 2 is a top view of the work garb alone.
Figure 3:
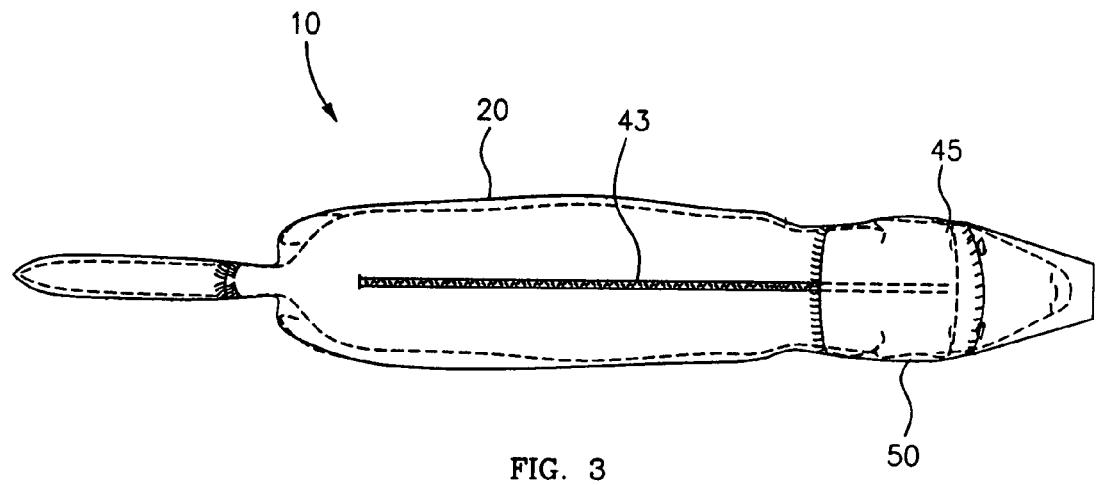
FIG. 3 is a top view of the dog and work garb of FIG. 1.
Figure 4:
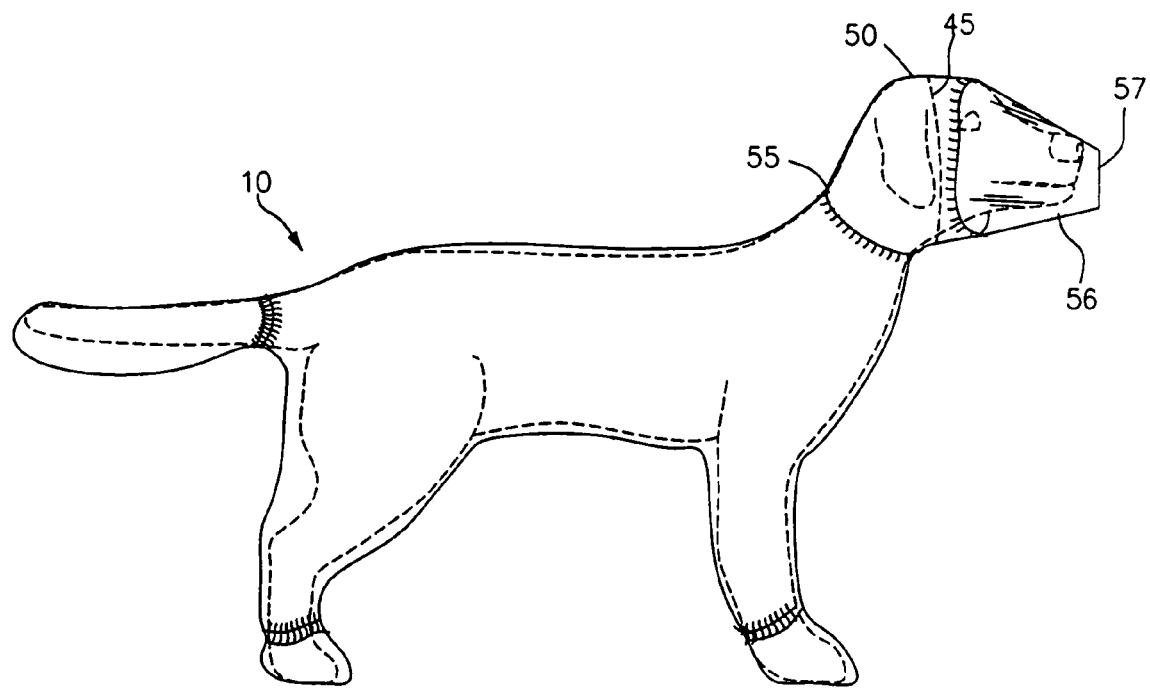
FIG. 4 is a side view of the dog and work garb of FIG. 1.

FIG. 2 shows the parts of work garb 10 in top view. FIG. 3 is a top view of the dog of FIG. 1. FIG. 4 is a side view of the dog of FIG. 1.

Coverall 20 covers the dog's entire body except for the front part of the head. Body portion 40 covers dog 100's torso and includes a long zipper 43 that selectively opens up back 42 of coverall 20 for dog 100 to don coverall 20. Neck/head portion 44 covers dog 100's neck and the back part of the head. Preferably, neck/head portion 44 terminates near the ears and preferably, as shown, terminates between dog 100's ears and eyes.

Neck/head portion 44 includes a cinching means, such as elastic band 45, for holding the edge of neck/head portion 44 snugly against the dog's head.

Coverall 20 includes a leg covering 22 for each leg. Each leg covering 22 is an elongated sleeve with a closed end. The closed end of leg covering 22 forms an integral bootie 24 for the foot. Cinching means, such as an elastic band 25, located just above the dog's foot, holds bootie 24 in place so that dog 100 may walk easily. Alternatively, elastic band 25 may be replaced with other cinching means for holding the bootie in place, such as a strap that is tied or otherwise secured above dog 100's foot.

Coverall 20 preferably includes a tail pouch 30 for enclosing dog 100's tail. Tail elastic 35 secures tail pouch 30 close to dog 100's tail about an inch or two from the base of the tail. Tail elastic 35 ensures that the tail does not slip inside coverall 20. Because some dogs 100 are trained to indicate the location of an odor by wagging the tail, it is necessary that the tail remains within tail pouch 30 so that wagging is easily seen.

Work garb 10 also includes a hood 50 for covering dog 100's head without interfering with dog 100's senses of vision or smell. Hood 50 generally comprises a bonnet portion 52 and a face shield 56.

Bonnet portion 52 is for covering the rear part of dog 100's head and overlapping neck/head portion 44 of coverall 20. Bonnet portion 52 includes neck elastic 55 to hold bonnet portion 52 tightly overlapped over neck/head portion 44.

Face shield 56 is attached to bonnet portion 52 and covers the front portion of dog 100's head. Face shield 56 is generally in the shape of a truncated cone and constructed from transparent, flexible plastic. Face shield 56 is open at the end near dog 100's nostrils to allow for unobstructed breathing and sampling of air for odors. Face shield 56 extends slightly beyond dog 100's snout so that dog 100 cannot touch any surface with unprotected nose 101, lips, or tongue.

Face shield 52 is preferably constructed of sheet material that is flexible enough to form into the general shape of a truncated cone that fits fairly snugly around the dog's snout. The preferred material is also sufficiently rigid when rolled into a conical shape that it extends past dog 100's nose 101 in a sufficiently rigid manner that dog 100 will not be able to easily dislodge or mash opening 57 and be able to contact dangerous materials with nose 101.

Face shield 56 may be permanently attached to bonnet portion 52, such as by adhesive or by sewing. Alternatively, face shield 56 may be detachable so that it is easily replaced if scratched or contaminated. For example, face shield 56 may be attached with snaps (not shown) that are covered by a placket.

In an alternative embodiment, not illustrated, face shield 56 comprises a transparent portion of hood 50 sufficient for dog 100 to see through. In such case, opening 57 in the distal end of hood 50 is rigidified, such as by including a plastic armature around opening 57.

Coverall 20 and bonnet portion 52 are constructed of suitable woven, knit, or non-woven sheet material that prevents passage of particles and microorganisms. Tyvek is an example of a non-woven material that is suitable for a single wearing. Suitable fabrics woven from synthetic fibers can be used to make work garb 10 that can be laundered and re-used many times. Zipper 43 must be of a type that does not generate free particles when operated. Alternative closure means include ties, snaps, hook and loop fastener, or similar.

Dog 100 must be appropriately prepared before donning work garb 10. Dog 100 is thoroughly brushed and bathed. After drying, dog 100 is vacuumed to remove loose hairs and dander. The vacuuming is done before entering the "gowning area" that is typically adjacent to the clean work area.

The vacuumed dog 100 then enters the gowning area. The human handler with dog 100 dons gloves before helping dog 100 don work garb 10. Zipper 43 is fully opened and coverall 20 is spread open for dog 100 to step into. Each of dog 100's feet goes into an appropriate leg cover 22 and the handler ensures that the foot is fully engaged into bootie 24, with elastic 25 disposed above the foot. Dog 100's tail is similarly placed into tail pouch 30. Then zipper 43 is closed and neck/head elastic 45 is smoothed in front of dog 100's ears.

Hood 50 is then pulled over dog 100's head from the front. Dog 100's snout goes into conical face shield 52 and neck elastic 55 is overlapped over neck/head portion 44 of coverall 20. The handler checks that dog 100's nostrils and lips are protected by face shield 52 and cannot touch any external surface.

This garbing process is typically performed with dog 100 and handler standing on a tacky mat so that any lint or bacteria stirred up by the process is eventually collected by the tacky mat. The human handler typically replaces the gloves with fresh ones after assisting dog 100 don work garb 10.

While work garb 10 has been described for use by a dog 100, it may be seen that work garb 10 can be adapted for use by a similar animal, such as a pig, without loss of the benefits of the invention.

Although particular embodiments of the invention have been illustrated and described, various changes may be made in the form, composition, construction, and arrangement of the parts herein without sacrificing any of its advantages. Therefore, it is to be understood that all matter herein is to be interpreted as illustrative and not in any limiting sense, and it is intended to cover in the appended claims such modifications as come within the true spirit and scope of the invention

I claim:

1. A method for locating a harmful substance in a cleanroom with an animal that is trained to identify the harmful substance by smell and indicate the location of the source of the smell; the animal consisting of a body portion and a head including eyes, ears, and a snout including a nose with nostrils and a mouth with lips and tongue; the method comprising the steps of:

suiting the animal in a suit for protecting the animal from contact with harmful substances while searching by smell for a harmful substance and for protecting the environs from contamination by the animal, the suit including: a coverall for covering at least the animal's body portion; and a hood for covering the animal's head; including: a transparent shield for covering the animal's eyes; and a nose opening disposed beyond the animal's nose allowing ambient air to reach the animal's nostrils during searching but preventing the animal from contacting surfaces exterior to the suit; other than the nose opening, the coverall and hood adapted for completely enclosing the animal during searching such that the harmful substance cannot contact the animal and the animal cannot contaminate the environs; and putting the suited animal in the cleanroom to be searched.

2. The method of claim 1 wherein the animal's body portion includes a tail and the coverall includes a tail pouch for covering the animal's tail including cinching means for securing the tail within the tail pouch such that movement of the tail is easily seen and for maintaining the tail outside of the remainder of said body portion of said coverall, and the step of suiting includes the steps of:

placing the animal's tail in the tail pouch; and positioning the cinching means proximal the base of said tail.

3. The method of claim 1 wherein the step of suiting includes the step of:

positioning the hood on the animal's head such that the transparent shield does not cover the animal's ears.

\* \* \* \* \*